United States Patent [19]
Seebinger

[11] 3,856,253
[45] Dec. 24, 1974

[54] ADJUSTABLE STAND

[75] Inventor: Frederick L. Seebinger, Smoke Rise, N.J.

[73] Assignee: American Trading and Production Corporation, Baltimore, Md.

[22] Filed: May 1, 1973

[21] Appl. No.: 356,225

[52] U.S. Cl............... 248/411, 248/354 C, 403/104
[51] Int. Cl............................................. F16b 7/14
[58] Field of Search ........... 248/411, 410, 414, 161, 248/188.5, 354 C, 354 L, 355; 403/104, 372, 403/373; 192/81 C; 188/67

[56] References Cited
UNITED STATES PATENTS

| | | | |
|---|---|---|---|
| 2,497,550 | 2/1950 | Jeffries................................ | 403/372 |
| 2,559,895 | 7/1951 | Norlander......................... | 192/81 C |
| 2,703,690 | 3/1955 | Petrick.............................. | 248/410 |
| 3,230,595 | 1/1966 | Kedem................................ | 403/104 |
| 3,480,247 | 11/1969 | Waner ................................ | 248/410 |
| 3,517,184 | 6/1970 | Norton et al. ...................... | 403/104 |
| 3,603,623 | 9/1971 | Widman............................. | 403/104 |

FOREIGN PATENTS OR APPLICATIONS
1,105,368  4/1961  Germany......................... 248/354 C

*Primary Examiner*—Marion Parsons, Jr.
*Attorney, Agent, or Firm*—Blum, Moscovitz, Friedman & Kaplan

[57] ABSTRACT

An improved adjustable stand of the type which is vertically upwardly and downwardly adjustable, including first and second telescopable rigid tubes, said first rigid tube being mounted at one end thereof on a base, resilient means interposed between said first and second rigid tubes for releasably biasing said second rigid tube in a normally fixed position relative to said first rigid tube; and clutch means for releasing said resilient means for vertically adjusting said second rigid tube relative to said first rigid tube.

10 Claims, 7 Drawing Figures

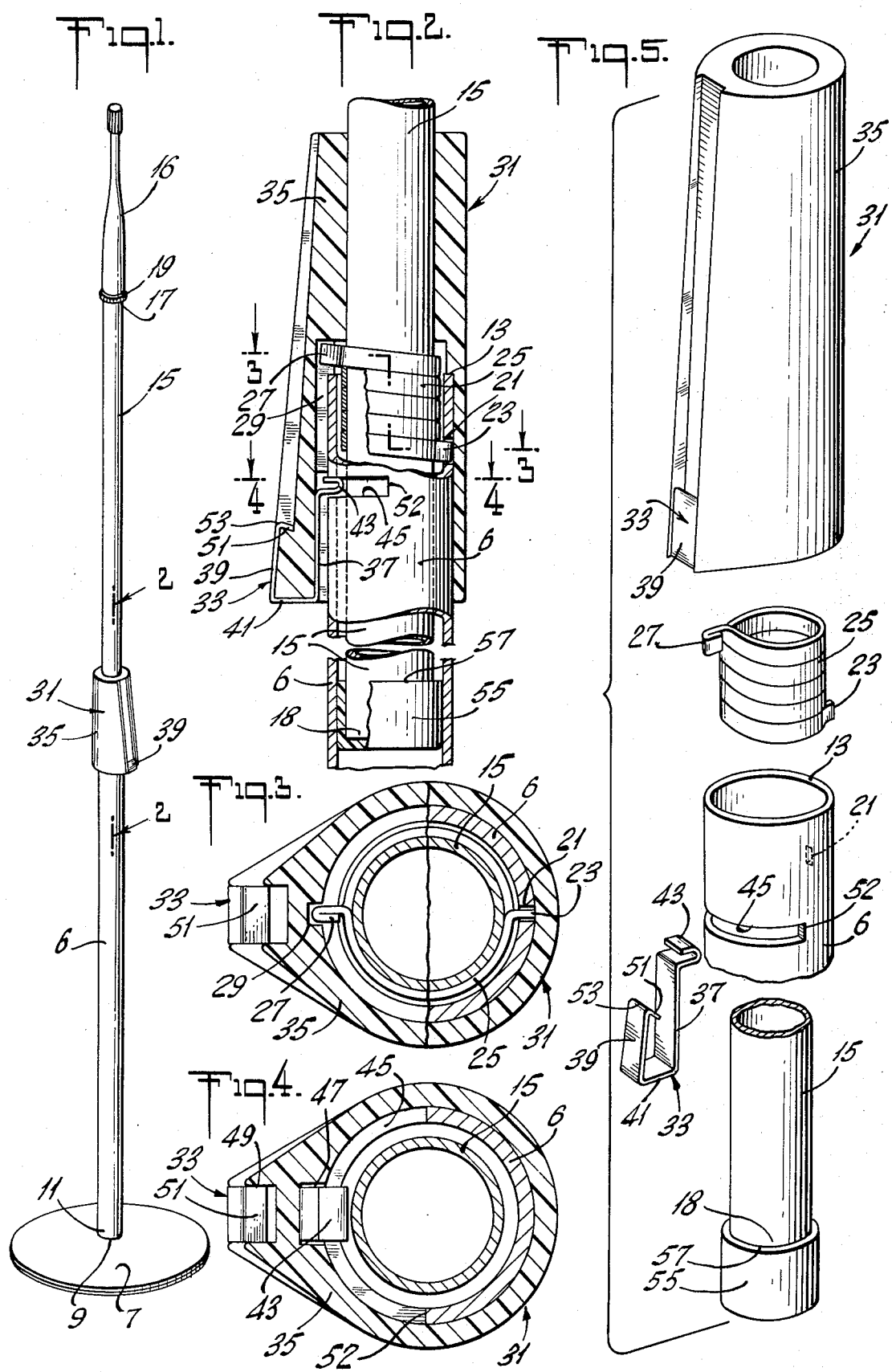

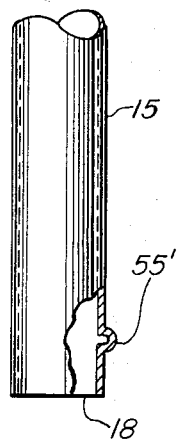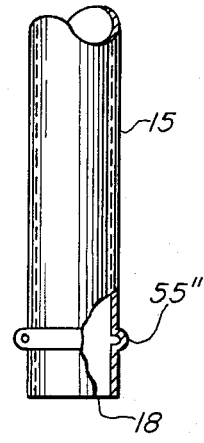

ADJUSTABLE STAND

BACKGROUND OF THE INVENTION

This invention relates generally to an improved adjustable stand of the type which is adjustable vertically upwardly or downwardly as desired. More particularly, this invention relates to an improved adjustable microphone stand which is lightweight, economical, fabricated of relatively few parts, and includes a retractable automatic clutch for adjusting stand height.

Prior adjustable clutch action stands have to be manually unlocked and locked for changing the relative positions of adjustable members thereof and the adjustable members may loosen or otherwise slide when not manually secured.

Accordingly, the instant invention provides an adjustable stand construction in which adjustable members may be fixed in positions as desired and, once fixed in position, are automatically securely locked in with direction therein until it is desired that the relative positions of the adjustable members be changed upwardly or downwardly. Moreover, the adjustment may be accomplished with relative ease.

SUMMARY OF THE INVENTION

Generally speaking, the adjustable stand of the present invention includes a base, a first rigid tube having an end connected to the base and an opposed free end upstanding therefrom, and a second rigid tube of lesser diameter than the first rigid tube and slidably connected therewith. The second rigid tube is telescopable within the first rigid tube and a resilient means is interposed between the first and second rigid tubes for releasably biasing the second rigid tube in a normally fixed position relative to the first rigid tube.

A clutch means actionable with the resilient means is connected with the first rigid tube for releasing the resilient means to thereby permit adjustment to the second rigid tube upwardly or downwardly relative to the first rigid tube. The clutch mans are discrete from the resilient means, but positioned to interact therewith, for normally maintaining the first and second rigid tubes in assembled releasably fixed relation, one with the other.

The term "base" as herein used in the specification and claims may refer to any holding surface, for instance a wall, vertical or horizontal, base plate, or bracket and the position of elements of the device may be taken as relative to the plane of the base.

The adjustable stand of the instant invention may be integrated with other devices which utilize the extensible feature thereof, for example medical examining lamps, intravenous administering devices, booms, camera tripods, sign displays, music stands, stands for musical instruments, and stanchions. Yet another common use for the stand is a microphone stand.

Other advantages and uses for the instant invention will, in part, be obvious and will, in part, be apparent from the specification.

The invention, accordingly, comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of an adjustable microphone stand in accordance with a preferred embodiment of this invention;

FIG. 2 is a partial sectional view, at an enlarged scale, taken along the line 2-2 of FIG. 1;

FIG. 3 is a cross-sectional view, at an enlarged scale, taken along the line 3-3 of FIG. 2;

FIG. 4 is a cross-sectional view, at an enlarged scale, taken along the line 4-4 of FIG. 2;

FIG. 5 is an exploded perspective view of an assembly detail of the embodiment shown in FIG. 2 and, FIGS. 6a and 6b are fragmentary detail views of alternative means for controlling telescopic adjustment of one tube relative to the other.

DESCRIPTION OF THE PREFERRED EMBODIMENTS

Referring now to the Figures, a tube 6 fabricated for example of metal, plastic or brass and preferably steel, with a desired diameter, for instance of about ⅞ inch, is mounted on a base 7, which may be fabricated of steel, cast iron, or plastic and stamped, cast or molded therefrom with a central aperture 9 for receiving an end 11 of tube 6. Tube 6 stands vertically upwardly on base 7 and free end 13 thereof receives rigid tube 15 of lesser diameter than tube 6, which may also be fabricated for example of metal, plastic or brass, and preferably steel and having a diameter of, for example, about ⅝ inch. Tube 15 is adapted to telescope within tube 6 and the extent to which tube 15 may telescope within tube 6 may depend upon the relative lengths thereof. Upwardmost end 17 of tube 15 may be provided with lock nut 19 which limits downward telescoping movement of tube 15 within tube 6 and provides means for fastening a device, for instance a microphone 16, to end 17 of tube 15. While the figures illustrate a lock nut 19 for limiting downward telescoping movement of tube 15 within tube 6, alternative means may be employed, for instance, tube 15 may be provided with one or more detents proximate end 17 which bulge the end portion thereof and thereby limit downward telescoping movement of tube 15 into tube 6.

Referring particularly to FIGS. 2, 3 and 5, tube 6 is provided with slot 21 for receiving an end 23 of resilient means 25, preferably a flat torsion spring fabricated, for example, of spring steel. Flat torsion spring 25 is interposed between tubes 6 and 15 and is wound about tube 15 for normally fixing the position of tube 15 relative to tube 6. Doubled-over end 27 of flat torsion spring 25 extends above end 13 of tube 6 and is received in slot 29 of clutch means 31.

Clutch means 31 includes assembly clip 33, preferably a spring clip fabricated, for example, of spring steel and clutch handle 35, which may be fabricated of metal, bakelite or other suitably rigid plastic material. Spring clip 33 includes leg members 37 and 39 connected one to the other by base member 41. Leg member 37 terminates in U-shaped body or repressor member 43 which is received in lateral slot 45 of tube 6. Clutch handle 35 is provided with detents 47 and 49 for removably connecting spring clip 33 thereto. Flange 51 integrally connected to leg member 39 of spring clip 33 along elbow 53 retains spring clip 33 in position on clutch handle 35 when spring clip 33 is connected therewith.

Referring particularly to FIG. 2, as assembled, clutch means 31 may be rotated counterclockwise for manually regulating the height of tube 15 relative to tube 6. As clutch means 31 is rotated counterclockwise doubled-over end 27 of flat torsion spring 25 is urged outwardly away from tube 15 and tension normally exerted by flat torsion spring 25 on tube 15 is thereby released and tube 15 may be upwardly or downwardly adjusted relative to tube 6 as desired. U-shaped body or repressor member 43 rides through slot 45 of tube 6 as clutch means 31 is rotated counterclockwise to release the normal tension of flat torsion spring 25 on tube 15. Counterclockwise rotation of clutch means 31 is limited by the length of lateral slot 45 and counterclockwise movement thereof is limited by end wall 52 defining lateral slot 45. Clutch means 31 may be rotated counterclockwise by grasping clutch handle 35 and manually rotating subject clutch means 31 thereby. After tube 15 is suitably adjusted to the desired vertical height, clutch handle 35 may be released and clutch means 31 will retract automatically to a normal position under the action of flat torsion spring 25 as it reassumes a normal position biasing tube 15 in position relative to tube 6.

Tube end 18 of tube 15 may be provided with a sleeve 55 which prevents the withdrawal of tube 15 from tube 6 during upward adjustment of tube 15 as clutch means 31 is rotated for effecting an adjustment to the height of tube 15 relative to tube 6. As tube 15 is withdrawn upwardly through tube 6, rim 57 of sleeve 55 eventually abuts U-shaped body or repressor 43 of spring clip 33 to prevent further upward adjustment thereof. Additionally, sleeve 55 provides desired friction against the tube wall of tube 6 during adjustment of tube 15 and prevents spontaneous and immediate downward adjustment of tube 15 within tube 6 as clutch means 31 is rotated to release tube 15. Therefore, if tube 15 is not securely held during rotation of clutch means 31, tube 15 will not spontaneously and instantly telescope within tube 6 and adjustments thereto may be made as desired. Alternative means may be employed for preventing the withdrawal of tube 15 from tube 6 during upward adjustment of tube 15 and tube 15 may, for instance, be provided with one or more detents proximate end 18 thereof which bulge the tube and prevent complete withdrawal thereof, from tube 6, as best seen in FIG. 6a, wherein tube 15 is provided with a detent 55'. As further alternatives, tube 15 may be capped on the end portion thereof or crimped to prevent withdrawal, as best seen in FIG. 6b wherein tube 15 is provided with a crimp 55''.

The improved adjustable stand of this invention may be assembled by inserting tube end 11 of tube 6 into aperture 9 of base 7. Wound flat torsion spring 25 may be secured around tube 15 proximate tube end 18 of tube 15, and thereafter sleeve 55 may be secured to tube 15 over tube end 18. Tube 15 thus assembled may be urged downwardly through tube 6 at tube end 13 thereof until spring end 23 of flat torsion spring 25 is received in slot 21 of tube 6. Thereafter, assembled clutch means 31 may be urged over assembled tubes 6 and 15 until U-shaped body 43 is received in lateral slot 45 of tube 6. Lock nut 19 may then be secured to end 17 of tube 15 to adapt end 17 for receiving microphone 16 therein.

It is to be understood that the embodiments shown in the drawings may be modified considerably, for example, the adjustable stand may include more than two telescopable tubes exemplified in the drawings, and yet a third tube may be provided which is adapted to telescope within tube 15 adjustable by suitable clutch means and which may receive microphone 18 at a free end thereof. Additionally, the configuration of assembly clip 33 and resilient means 25 may be altered without effecting the operation of the instant invention. Also, alternate means may be employed for assembling component elements, assembly clip 33 and clutch handle 35 of clutch means 31.

It will thus be seen that the advantages of this improved adjustable stand set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An adjustable stand comprising a base, a first rigid tube having an end connected to said base and an opposed free end upstanding therefrom, a second right tube of lesser diameter than said first rigid tube and slidably connected therewith, said second rigid tube being telescopable within said first rigid tube, resilient means between said first and second rigid tubes for releasably biasing said second rigid tube in a normally fixed position relative to said first rigid tube, and clutch means for releasing said resilient means for vertically adjusting said second rigid tube relative to said first rigid tube, said clutch means being discrete from said resilient means for normally maintaining said first and second rigid tubes in assembled relation and comprising an assembly clip including a pair of leg members connected one to the other by a base member, one of said legs terminating in a U-shaped body extending initially outwardly from the plane of said leg and returning inwardly toward the plane of said leg, said first rigid tube being provided with a lateral slot for receiving said U-shaped body, said U-shaped body being rotatable through said lateral slot for releasing tension of said resilient means on said second rigid tube whereby said second rigid tube may be vertically adjusted relative to said first rigid tube.

2. The adjustable stand of claim 1 including a slot in said first rigid tube for receiving an end of said resilient means, said slot being proximate said free end of said first rigid tube and in spaced relation therefrom, and a slot in said clutch means for receiving another end of said resilient means, each slot being selectively spaced, one from the other, and wherein said resilient means is a torsion spring, having opposed ends, surrounding said second rigid tube.

3. The adjustable stand of claim 2 wherein said opposed ends of said torsion spring are removably connected to said first rigid tube and said clutch means, respectively, said opposed ends of said torsion spring including a flanged member at each end thereof and a pair of elbows, one elbow connecting each of said flanged members to the main body of said torsion spring, said flanged members being generally perpendicular to the axis of said torsion spring, each of said flanged members being respectively received in a receiving slot of said first rigid tube and said clutch means.

4. The adjustable stand of claim 1 including a sleeve fixedly mounted on said second rigid tube for limiting upward extensibility of said second rigid tube relative to said first rigid tube, said sleeve being arranged to abut said U-shaped body of said assembly clip as said second rigid tube is adjusted upwardly and thereby limit upward adjustment thereof.

5. The adjustable stand of claim 1 including at least one detent defined in said second rigid tube thereby bulging at least a portion of said second rigid tube for limiting upward extensibility of said second rigid tube relative to said first rigid tube, said at least one detent being arranged for causing said bulged portion of said second rigid tube to abut said U-shaped body of said assembly clip as said second rigid tube is adjusted upwardly and thereby limit upward adjustment thereof.

6. The adjustable stand of claim 1 including at least one crimp in said second rigid tube for limiting upward extensibility thereof relative to said first rigid tube, said at least one crimp being arranged to abut said U-shaped body of said assembly clip as said second rigid tube is adjusted upwardly and thereby limit upward adjustment thereof.

7. A clutch for regulating the relative lengths of a pair of telescoping rigid tubes, a second rigid tube being of lesser diameter than a first rigid tube for telescoping therein comprising resilient means between said first and second rigid tubes for releasably biasing said second rigid tube in a normally fixed position relative to said first rigid tube, said resilient means having opposed ends and surrounding said second rigid tube, and an assembly clip including a pair of leg members connected one to the other by a base member, one of said leg members terminating in an elbow connecting a repressor member thereto, said first rigid tube being provided with a lateral slot for receiving said repressor member, said repressor member being rotatable through said lateral slot for releasing tension of said resilient means on said second rigid tube whereby said second rigid tube may vertically adjusted relative to said first rigid tube, said resilient means being automatically retractable to a normal biasing position with release of rotating pressure on said repressor member.

8. The clutch of claim 7 including a handle member for supporting said assembly clip and for rotating said repressor member through said lateral slot for adjusting said second rigid tube relative to said first rigid tube.

9. The clutch of claim 8 including a slot in said first rigid tube for receiving an end of said resilient means, said slot being proximate and end of said first rigid tube and in spaced relation therefrom, and a slot in said handle member for receiving another end of said resilient means, each slot being selectively spaced, one from the other, and wherein said resilient means is a flat helically wound torsion spring.

10. The clutch of claim 9 wherein said opposed ends of said torsion spring are releasably connected to said first rigid tube and said handle member, respectively, said opposed ends of said torsion spring including a flanged member on each end thereof and a pair of elbows, one elbow connecting each of said flanged members to the main body of said torsion spring, said flanged members being generally perpendicular to the axis of said torsion spring, each of said flanged members being respectively received in a receiving slot of said first rigid tube and said handle member.

* * * * *